United States Patent
Kostoff, II et al.

(10) Patent No.: US 8,149,703 B2
(45) Date of Patent: Apr. 3, 2012

(54) POWERLINE NETWORK BRIDGING CONGESTION CONTROL

(75) Inventors: Stanley J. Kostoff, II, Ocala, FL (US);
Brian E. Markwalter, Ocala, FL (US);
William E. Earnshaw, Ocala, FL (US);
James Philip Patella, Hernando, FL (US)

(73) Assignee: Qualcomm Atheros, Inc., San Jose, CA (US)

( * ) Notice: Subject to any disclaimer, the term of this patent is extended or adjusted under 35 U.S.C. 154(b) by 1010 days.

(21) Appl. No.: 10/180,176

(22) Filed: Jun. 26, 2002

(65) Prior Publication Data
US 2004/0001440 A1 Jan. 1, 2004

(51) Int. Cl.
*H04J 3/14* (2006.01)
*H04L 12/26* (2006.01)

(52) U.S. Cl. ............... 370/232; 370/235; 370/236

(58) Field of Classification Search ............ 370/229, 370/230, 235, 236, 250, 338, 352, 401, 432, 370/446, 463; 709/2, 224, 227, 230, 250
See application file for complete search history.

(56) References Cited

U.S. PATENT DOCUMENTS

| | | |
|---|---|---|
| 3,806,885 A | 4/1974 | Moore |
| 4,569,044 A | 2/1986 | Tao et al. |
| 4,581,734 A | 4/1986 | Olson et al. |
| 4,630,261 A | 12/1986 | Irvin |
| 4,677,612 A | 6/1987 | Olson et al. |
| 4,682,324 A | 7/1987 | Ulug |
| 4,720,850 A | 1/1988 | Oberlander et al. |
| 4,726,018 A | 2/1988 | Bux et al. |
| 4,792,947 A | 12/1988 | Takiyasu et al. |
| 4,819,229 A | 4/1989 | Pritty et al. |
| 4,881,241 A | 11/1989 | Pommier et al. |
| 4,943,959 A | 7/1990 | Arnold |
| 5,001,472 A | 3/1991 | Fischer et al. |
| 5,003,539 A | 3/1991 | Takemoto et al. |
| 5,046,069 A | 9/1991 | Calvignac et al. |
| 5,081,678 A | 1/1992 | Kaufman et al. |
| 5,105,423 A | 4/1992 | Tanaka et al. |
| 5,121,396 A | 6/1992 | Irvin et al. |
| 5,140,584 A | 8/1992 | Suzuki |
| 5,157,659 A | 10/1992 | Schenkel |
| 5,197,061 A | 3/1993 | Halbert-Lassalle et al. |

(Continued)

FOREIGN PATENT DOCUMENTS
DE 3413144 10/1985
(Continued)

OTHER PUBLICATIONS
U.S. Appl. No. 09/632,303, filed Aug. 4, 2000, Young, III.
(Continued)

*Primary Examiner* — Marcus R Smith
(74) *Attorney, Agent, or Firm* — Meyertons Hood Kivlin Kowert & Goetzel, P.C.

(57) ABSTRACT

In a powerline network, a power line node device coupled to a host bridge application detects a "jam packet" in response to an attempt to pass a frame to the host bridge application. The powerline node device uses internal logic to override a conventional ARQ response to this and subsequent frames, in particular, when such frames are of the type for which a response is expected, with an automatic FAIL response for a predetermined time interval.

11 Claims, 5 Drawing Sheets

U.S. PATENT DOCUMENTS

| | | | |
|---|---|---|---|
| 5,214,646 A | 5/1993 | Yacoby | |
| 5,228,025 A | 7/1993 | Le Floch et al. | |
| 5,231,634 A | 7/1993 | Giles et al. | |
| 5,274,629 A | 12/1993 | Helard et al. | |
| 5,280,480 A | 1/1994 | Pitt et al. | |
| 5,307,376 A | 4/1994 | Castelain et al. | |
| 5,339,313 A | 8/1994 | Ben-Michael et al. | |
| 5,343,473 A | 8/1994 | Cidon et al. | |
| 5,384,777 A | 1/1995 | Ahmadi et al. | |
| 5,416,801 A | 5/1995 | Chouly et al. | |
| 5,426,646 A | 6/1995 | Slack | |
| RE35,001 E | 7/1995 | Grow | |
| 5,432,848 A | 7/1995 | Butter et al. | |
| 5,436,905 A | 7/1995 | Li et al. | |
| 5,448,565 A | 9/1995 | Chang et al. | |
| 5,452,288 A | 9/1995 | Rahuel et al. | |
| 5,452,322 A | 9/1995 | Lauer | |
| 5,473,602 A | 12/1995 | McKenna et al. | |
| 5,481,535 A | 1/1996 | Hershey | |
| 5,483,529 A | 1/1996 | Baggen et al. | |
| 5,488,632 A | 1/1996 | Mason et al. | |
| 5,504,747 A | 4/1996 | Sweazey | |
| 5,515,379 A | 5/1996 | Crisler et al. | |
| 5,524,027 A | 6/1996 | Huisken | |
| 5,537,414 A | 7/1996 | Takiyasu et al. | |
| 5,541,922 A | 7/1996 | Pyhalammi | |
| 5,548,649 A | 8/1996 | Jacobson | |
| 5,555,268 A | 9/1996 | Fattouche et al. | |
| 5,563,883 A | 10/1996 | Cheng | |
| 5,563,897 A | 10/1996 | Pyndiah et al. | |
| 5,568,476 A | 10/1996 | Sherer et al. | |
| 5,610,908 A | 3/1997 | Shelswell et al. | |
| 5,612,975 A | 3/1997 | Becker et al. | |
| 5,615,212 A | 3/1997 | Ruszczyk et al. | |
| 5,619,651 A | 4/1997 | Young | |
| 5,623,512 A | 4/1997 | Sasaki | |
| 5,627,829 A | 5/1997 | Gleeson et al. | |
| 5,629,948 A | 5/1997 | Hagiwara et al. | |
| 5,636,230 A | 6/1997 | Marturano et al. | |
| 5,644,576 A | 7/1997 | Bauchot et al. | |
| 5,651,009 A | 7/1997 | Perreault et al. | |
| 5,694,389 A | 12/1997 | Seki et al. | |
| 5,706,348 A | 1/1998 | Gray et al. | |
| 5,717,689 A | 2/1998 | Ayanoglu | |
| 5,732,113 A | 3/1998 | Schmidl et al. | |
| 5,737,330 A | 4/1998 | Fulthorp et al. | |
| 5,745,769 A | 4/1998 | Choi | |
| 5,757,766 A | 5/1998 | Sugita | |
| 5,757,770 A | 5/1998 | Lagoutte et al. | |
| 5,764,931 A | 6/1998 | Schmahl et al. | |
| 5,771,235 A | 6/1998 | Tang et al. | |
| 5,787,071 A | 7/1998 | Basso et al. | |
| 5,790,541 A | 8/1998 | Patrick et al. | |
| 5,793,307 A | 8/1998 | Perreault et al. | |
| 5,799,033 A | 8/1998 | Baggen | |
| 5,812,599 A | 9/1998 | Van Kerckhove | |
| 5,818,821 A | 10/1998 | Schurig | |
| 5,818,826 A | 10/1998 | Gfeller et al. | |
| 5,825,807 A | 10/1998 | Kumar | |
| 5,828,677 A | 10/1998 | Sayeed et al. | |
| 5,841,778 A | 11/1998 | Shaffer et al. | |
| 5,841,873 A | 11/1998 | Lockhart et al. | |
| 5,884,040 A | 3/1999 | Chung | |
| 5,886,993 A | 3/1999 | Ruszczyk et al. | |
| 5,892,769 A | 4/1999 | Lee | |
| 5,896,561 A | 4/1999 | Schrader et al. | |
| 5,903,614 A | 5/1999 | Suzuki et al. | |
| 5,914,932 A | 6/1999 | Suzuki et al. | |
| 5,914,959 A | 6/1999 | Marchetto et al. | |
| 5,940,399 A | 8/1999 | Weizman | |
| 5,940,438 A | 8/1999 | Poon et al. | |
| 5,948,060 A | 9/1999 | Gregg et al. | |
| 5,956,338 A | 9/1999 | Ghaibeh | |
| 5,966,412 A | 10/1999 | Ramaswamy | |
| 5,970,062 A | 10/1999 | Bauchot | |
| 5,987,011 A | 11/1999 | Toh | |
| 6,005,894 A | 12/1999 | Kumar | |
| 6,006,017 A | 12/1999 | Joshi et al. | |
| 6,041,063 A | 3/2000 | Povlsen et al. | |
| 6,041,358 A | 3/2000 | Huang et al. | |
| 6,044,154 A | 3/2000 | Kelly | |
| 6,044,482 A | 3/2000 | Wong | |
| 6,052,377 A | 4/2000 | Ohmi et al. | |
| 6,076,115 A | 6/2000 | Sambamurthy et al. | |
| 6,092,214 A | 7/2000 | Quoc et al. | |
| 6,097,703 A | 8/2000 | Larsen et al. | |
| 6,098,179 A | 8/2000 | Harter, Jr. | |
| 6,108,713 A | 8/2000 | Sambamurthy et al. | |
| 6,125,150 A | 9/2000 | Wesel et al. | |
| 6,130,887 A | 10/2000 | Dutta | |
| 6,130,894 A | 10/2000 | Ojard et al. | |
| 6,151,296 A | 11/2000 | Vijayan et al. | |
| 6,169,744 B1 | 1/2001 | Grabelsky et al. | |
| 6,170,022 B1 * | 1/2001 | Linville et al. | 710/29 |
| 6,182,147 B1 | 1/2001 | Farinacci | |
| 6,188,717 B1 | 2/2001 | Kaiser et al. | |
| 6,192,397 B1 | 2/2001 | Thompson | |
| 6,202,082 B1 | 3/2001 | Tomizawa et al. | |
| 6,215,792 B1 | 4/2001 | Abi-Nassif | |
| 6,216,244 B1 | 4/2001 | Myers et al. | |
| 6,222,851 B1 | 4/2001 | Petry | |
| 6,243,386 B1 | 6/2001 | Chan et al. | |
| 6,243,449 B1 | 6/2001 | Margulis et al. | |
| 6,246,770 B1 | 6/2001 | Stratton et al. | |
| 6,252,849 B1 | 6/2001 | Rom et al. | |
| 6,259,696 B1 | 7/2001 | Yazaki et al. | |
| 6,263,445 B1 | 7/2001 | Blumenau | |
| 6,275,861 B1 | 8/2001 | Chaudri et al. | |
| 6,278,685 B1 | 8/2001 | Yonge, III et al. | |
| 6,278,716 B1 | 8/2001 | Rubenstein et al. | |
| 6,289,000 B1 | 9/2001 | Yonge, III | |
| 6,295,296 B1 | 9/2001 | Tappan | |
| 6,334,185 B1 | 12/2001 | Hansson et al. | |
| 6,343,083 B1 | 1/2002 | Mendelson et al. | |
| 6,345,310 B1 * | 2/2002 | Allison et al. | 709/250 |
| 6,363,052 B1 | 3/2002 | Hosein | |
| 6,370,156 B2 | 4/2002 | Spruyt et al. | |
| 6,385,672 B1 | 5/2002 | Wang et al. | |
| 6,397,368 B1 | 5/2002 | Yonge, III et al. | |
| 6,421,725 B1 | 7/2002 | Vermilyea et al. | |
| 6,430,192 B1 | 8/2002 | Creedon et al. | |
| 6,430,661 B1 | 8/2002 | Larson et al. | |
| 6,434,153 B1 | 8/2002 | Yazaki et al. | |
| 6,442,129 B1 | 8/2002 | Yonge, III et al. | |
| 6,456,649 B1 | 9/2002 | Isaksson et al. | |
| 6,466,580 B1 | 10/2002 | Leung | |
| 6,469,992 B1 | 10/2002 | Schieder | |
| 6,473,435 B1 | 10/2002 | Zhou et al. | |
| 6,480,489 B1 | 11/2002 | Muller et al. | |
| 6,487,212 B1 | 11/2002 | Erimli et al. | |
| 6,501,760 B1 | 12/2002 | Ohba et al. | |
| 6,519,263 B1 | 2/2003 | Huth | |
| 6,526,451 B2 | 2/2003 | Kasper | |
| 6,538,985 B1 | 3/2003 | Petry et al. | |
| 6,538,990 B1 * | 3/2003 | Prorock | 370/229 |
| 6,553,534 B2 | 4/2003 | Yonge, III et al. | |
| 6,567,914 B1 | 5/2003 | Just et al. | |
| 6,628,613 B1 * | 9/2003 | Joung et al. | 370/230 |
| 6,654,410 B2 | 11/2003 | Tzannes | |
| 6,667,991 B1 | 12/2003 | Tzannes | |
| 6,671,284 B1 | 12/2003 | Yonge, III et al. | |
| 6,680,911 B1 * | 1/2004 | Kim | 370/235 |
| 6,697,358 B2 * | 2/2004 | Bernstein | 370/352 |
| 6,741,561 B1 * | 5/2004 | Lee | 370/230 |
| 6,747,976 B1 | 6/2004 | Bensaou et al. | |
| 6,765,885 B2 | 7/2004 | Jiang et al. | |
| 6,778,507 B1 | 8/2004 | Jalali | |
| 6,877,043 B2 * | 4/2005 | Mallory et al. | 709/251 |
| 6,882,637 B1 | 4/2005 | Le et al. | |
| 6,957,269 B2 * | 10/2005 | Williams et al. | 709/235 |
| 6,980,520 B1 * | 12/2005 | Erimli | 370/236 |
| 7,180,857 B2 * | 2/2007 | Kawakami et al. | 370/231 |
| 2001/0012319 A1 | 8/2001 | Foley | |
| 2001/0043576 A1 | 11/2001 | Terry | |
| 2001/0048692 A1 | 12/2001 | Karner | |
| 2002/0001314 A1 | 1/2002 | Yi et al. | |
| 2002/0012320 A1 | 1/2002 | Ogier et al. | |

| | | | |
|---|---|---|---|
| 2002/0042836 | A1 | 4/2002 | Mallory |
| 2002/0048368 | A1 | 4/2002 | Gardner |
| 2002/0065047 | A1 | 5/2002 | Moose |
| 2002/0131591 | A1 | 9/2002 | Henson et al. |
| 2002/0191533 | A1 | 12/2002 | Chini et al. |
| 2003/0006883 | A1 | 1/2003 | Kim et al. |
| 2003/0067910 | A1* | 4/2003 | Razazian et al. ............ 370/352 |
| 2003/0079169 | A1 | 4/2003 | Ho et al. |
| 2003/0133427 | A1* | 7/2003 | Cimini et al. ............ 370/338 |
| 2003/0174664 | A1 | 9/2003 | Benveniste |
| 2003/0217182 | A1 | 11/2003 | Liu et al. |
| 2003/0231652 | A1 | 12/2003 | Sprague et al. |
| 2003/0231658 | A1 | 12/2003 | Liang et al. |

FOREIGN PATENT DOCUMENTS

| | | |
|---|---|---|
| WO | 98/57440 | 12/1998 |
| WO | WO00/72495 | 11/2000 |
| WO | 02/41598 | 5/2002 |

OTHER PUBLICATIONS

U.S. Appl. No. 10/180,175, filed Jun. 26, 2002, Patella et al.
Kamerman, A; Aben, G; Net throughput with IEEE 802.11 wireless LANs; Wireless Communications and Networking Conference, 2000. WCNC 2000 IEEE, vol. 2, Sep. 23-28, 2000; pp. 747-752.
Dube, P.; Altman, E.; Queueing analysis of early message discard policy; Communications, 2002. ICC 2002. IEEE International Conference, vol. 4, Iss., 2002, pp. 2426-2430.
U.S. Appl. No. 09/632,303.
Sun et al., Public-key ID-based Cryptosystem, 1991, IEEE, pp. 142-144.
Bruschi, Danilo, Secure Multicast in Wireless Networks of Mobile Hosts: Protocols and Issues, 2002, Mobile Networks and Applications, pp. 503-511.
IBM, Combined use of collision resolution and collision avoidance MAC protocols, Oct. 1, 1994, IBM Technical Disclosure Bulletin, vol. 37, pp. 299-302.
ISO/IEC 8802-3: 2002 International Standard (ANSI/IEEE Std 802.3) Carrier sense multiple access with collision detection (CSMA/CD) access method and physical layer specifications.
ISO/IEC 8802-11: 1999 International Standard (ANSI/IEEE Std 802.11) Wireless LAN Medium Access Control (MAC) and Physical Layer (PHY) specifications.
Shared Wireless Access Protocol (Cordless Access) Specification, SWAP-CA Revision 1.21, Jan. 27, 1999, by the HomeRF™ Technical Committee.
Interface Specification for HomePNA™ 2.0—10M8 Technology, Dec. 1, 1999.
Interface Specification for HomePNA™ 2.0—10M8 Technology—Link Layer Protocols, Dec. 1, 1999.
Bux, "Token-Ring Local-Area Networks and Their Performance," Procs. Of the IEEE, vol. 77, No. 2, Feb. 1989.
Applied Cryptography, Second Edition: protocols, algorithms, and source code in C, Bruce Schneier, 1996.
PKCS #5 v. 20: Password-Based Cryptography Standard, RSA Laboratories, Mar. 25, 1999.
Lee et al., "HomePlug 1.0 powerline communication LANs—protocol description and performance results", Int. J. Commun. Syst., vol. 16 (2003).
Carrier sense multiple access with collision detection (CSMA/CD) access method and physical layer specifications, ISO/IEC 8802-3: 1996 International Standard (ANSI/IEEE Std 802.3).
Bertsekas et al., Data Networks, Prentice Hall, Englewood Cliffs, NJ, Section 2.4.3 Selective Repeat ARQ (1992).
HiPerformance Radio Local Area Network (HiperLAN) Type I: Functional Specification, European Standard (Telecommunication Series) No. 300652 V. 1.2.1 Jul. 1998.
An Architecture for Differentiated Services, IETF RFC 2475, Dec. 1998.
Goalic et al., "Real-Time Turbo-Decoding of Product Codes on a Digital Signal Processor," IEEE, pp. 624-628 (1997).
Benedetto et al., "A Soft-Input Soft-Output Maximum A Posteriori (MAP) Module to Decode Parallel and Serial Concatenated Codes," TDA Progress Report 42-127, pp. 1-20 (Nov. 1996).
Peterson et al., "Error-Correcting Codes," The MIT Press (1972).
Pyndiah, "Near-Optimum Decoding of Product Codes: Block Turbo Codes," IEEE Transactions on Communications, vol. 46, No. 8, pp. 1003-1010 (Aug. 1998).
Pyndiah, "Near Optimum Decoding of Product Codes," IEEE, pp. 339-343 (1994).
Pyndiah, "Performance of Block Turbo Coded 16-QAM and 64-QAM Modulations," IEEE, pp. 1039-1043 (1995).
Ehrsam et al., "A cryptographic key management scheme for implementing the Data Encryption Standard," IBM Syst J, vol. 17, No. 2 (1978).
HomePlug Powerline Alliance, HomePlug 1.0.1 Specification, Dec. 1, 2001.

* cited by examiner

POWERLINE NETWORK BRIDGING CONGESTION CONTROL

BACKGROUND

The invention relates generally to network congestion and flow control.

In a bridged network environment, two networks are interconnected by either a bridge (or a router). When one network transmits into the other network, the bridge stores the traffic from that network in buffers until the bridge has an opportunity to transmit the buffered traffic into the other network. Typically, when the buffers in the bridge reach a certain threshold of fullness, i.e., when congestion occurs, e.g., because the transmitting network is operating at a higher speed than the other (receiving) network or the receiving network is heavily congested, the bridge uses one of two techniques to "flow control" further traffic that the transmitting network wishes to transmit to the other network. First, the bridge can transmit to the transmitting network a frame having an illegally long length. Such transmission has the effect of slowing down the traffic from that network, giving the bridge time to unload its buffers. Second, the bridge can transmit a "jam packet" in response to a frame from a node in the transmitting network, thus causing that node to re-transmit using its exponential back-off algorithm. Again, the effect on the bridge being that the bridge has gained time to unload its buffers.

In powerline network applications, however, these techniques are problematic. Current powerline modem device implementations discard any "illegally long" frame from the bridge because the length of that frame exceeds a defined maximum length. Also, the transmitted jam packet is too short in length to be received by any device on a power line network. Thus, both techniques have no effect on flow control of the transmitting network when the transmitting network is a powerline network.

SUMMARY

In one aspect, the invention provides methods and apparatus, including computer program products, for performing flow control in a network. The methods include: (i) detecting receipt of a jam packet from a bridge device in response to an attempt to transmit a frame received from a node in a network of nodes to the bridge device; and (ii) for a predetermined time interval, causing a fail response to be transmitted to the network for the frame and any subsequent frames transmitted by any of the nodes when such frames are of the type for which a response is expected.

Embodiments of the invention may include one or more of the following features.

Causing the fail response to be transmitted to the network can include asserting a fail response override signal when the receipt of the jam packet is detected, setting a fail response override timer to time the predetermined time interval and de-asserting the fail response override signal upon expiration of the fail response override signal.

Causing the fail response to be transmitted to the network can further include determining if a frame transmitted by one of the nodes is a unicast frame for which a response is expected and determining if the fail response override signal is asserted.

A fail response can be transmitted if it is determined that the frame is a unicast frame for which a response is expected and that the fail response override signal is asserted. Otherwise, a response can be sent in accordance with ARQ protocol.

The network of nodes can be a powerline network.

The nodes in the network can operate according to HomePlug 1.0 Specification protocols.

The jam packet can be received over a Media Independent Interface bus.

The bridge device can be a host computer that executes a bridge application.

Particular implementations of the invention may provide one or more of the following advantages.

The fail response override mechanism allows the bridge device the time to mitigate the congestion conditions that gave rise to the transmission of the jam packet. It is particularly useful in a powerline network, as the jam packet might be dropped (thus having no impact on flow control) or, if it is transmitted onto the powerline network, still having no effect on flow control as it may be too short to be received.

Other features and advantages of the invention will be apparent from the following detailed description and from the claims.

DETAILED DESCRIPTION

Figure 1:
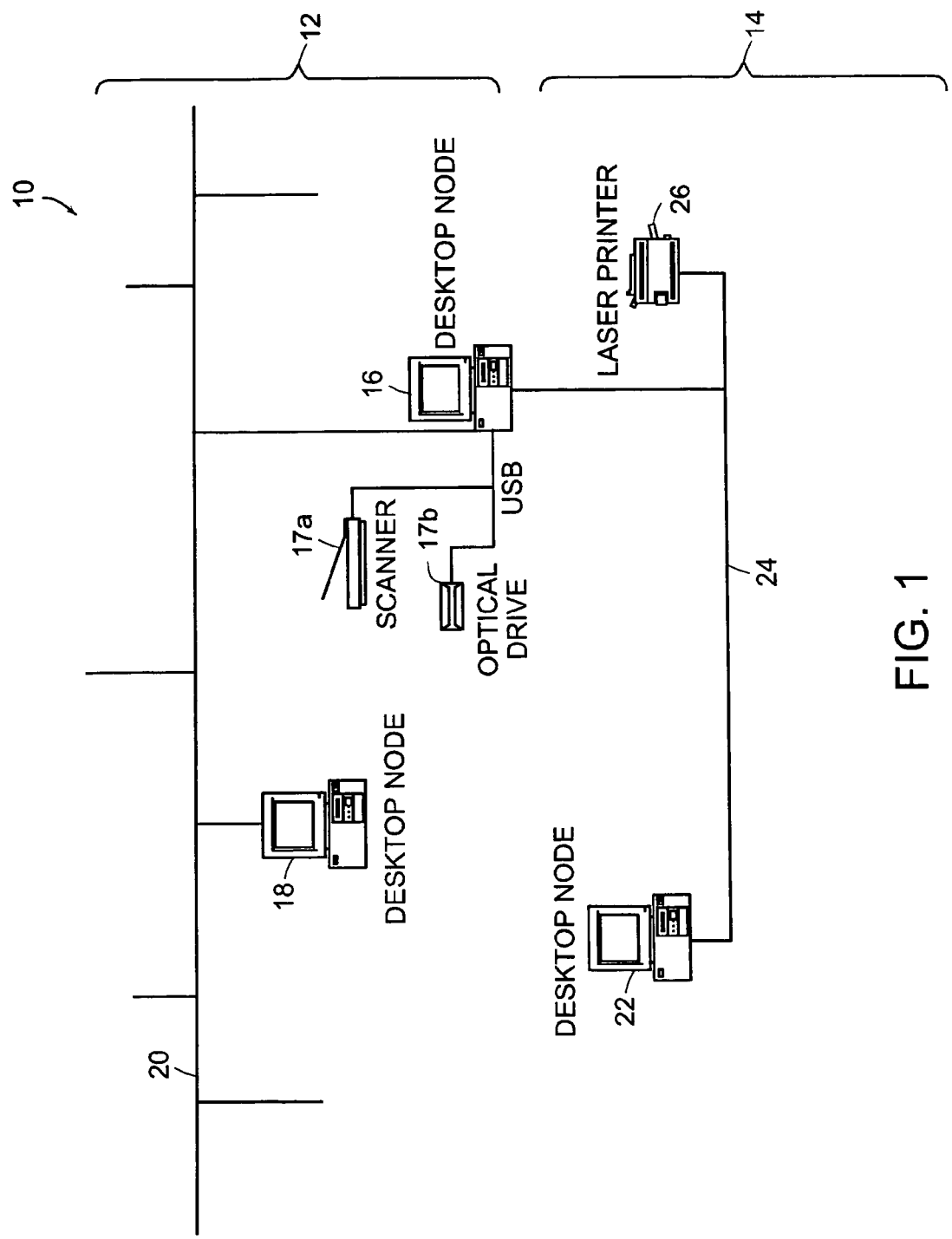
FIG. 1 is an exemplary network topology in which an Ethernet network is coupled to a powerline network by an Ethernet-to-powerline bridge device.

Referring to FIG. 1, in a bridged network environment 10, a first network 12, shown as a powerline ("PL") network, is coupled to a second network 14, shown as an Ethernet network, via a bridge device 16. The bridge device 16 is illustrated as a desktop node, which appears as a node on both networks 12 and 14. Connected to the desktop node 16 are various peripheral devices, such as a scanner 17a and an optical drive 17b, as shown. In the example shown, the PL network 12 includes one or more PL network nodes, including the bridge device 16 and a PL network node 18 (also shown as a desktop node), connected to a PL transmission medium 20. The Ethernet network 14 includes an Ethernet network node 22 (shown as a desktop computer) as well as the bridge device 16 connected to an Ethernet transmission medium 24. The network 14 can include other nodes as well. In addition, the network 14 can include devices such as a laser printer 26, as shown. The bridge device 16, which serves as an Ethernet-to-PL bridge, is implemented as a desktop computer node and therefore supports both host and bridging applications, as well as appropriate functionality for interfacing to the Ethernet and PL networks (networks 14 and 12, respectively), as will be described. It will be appreciated, however, that the bridge device 16 may be a standalone bridge device or a bridge device that is coupled to a host computer.

In the environment 10, the first network 12 transmits traffic through the bridge device 16 to the second network 14. When the first network 12 transmits into the second network 14, the bridge device 16 stores the traffic from the first network 12 in buffers until the bridge device 16 has an opportunity to transmit the buffered traffic into the second network 14. The second network 14 may be operating at a lower speed than the first network 12 or become heavily congested. Under such conditions, the bridge device 16 may be unable to empty its buffers fast enough to accommodates incoming traffic from the first network 12. If the bridge device 16 is unable to empty its buffers and the buffers in the bridge device 16 reach a certain threshold of fullness, the bridge device itself becomes congested and exerts back pressure on the first network 12.

Figure 2:
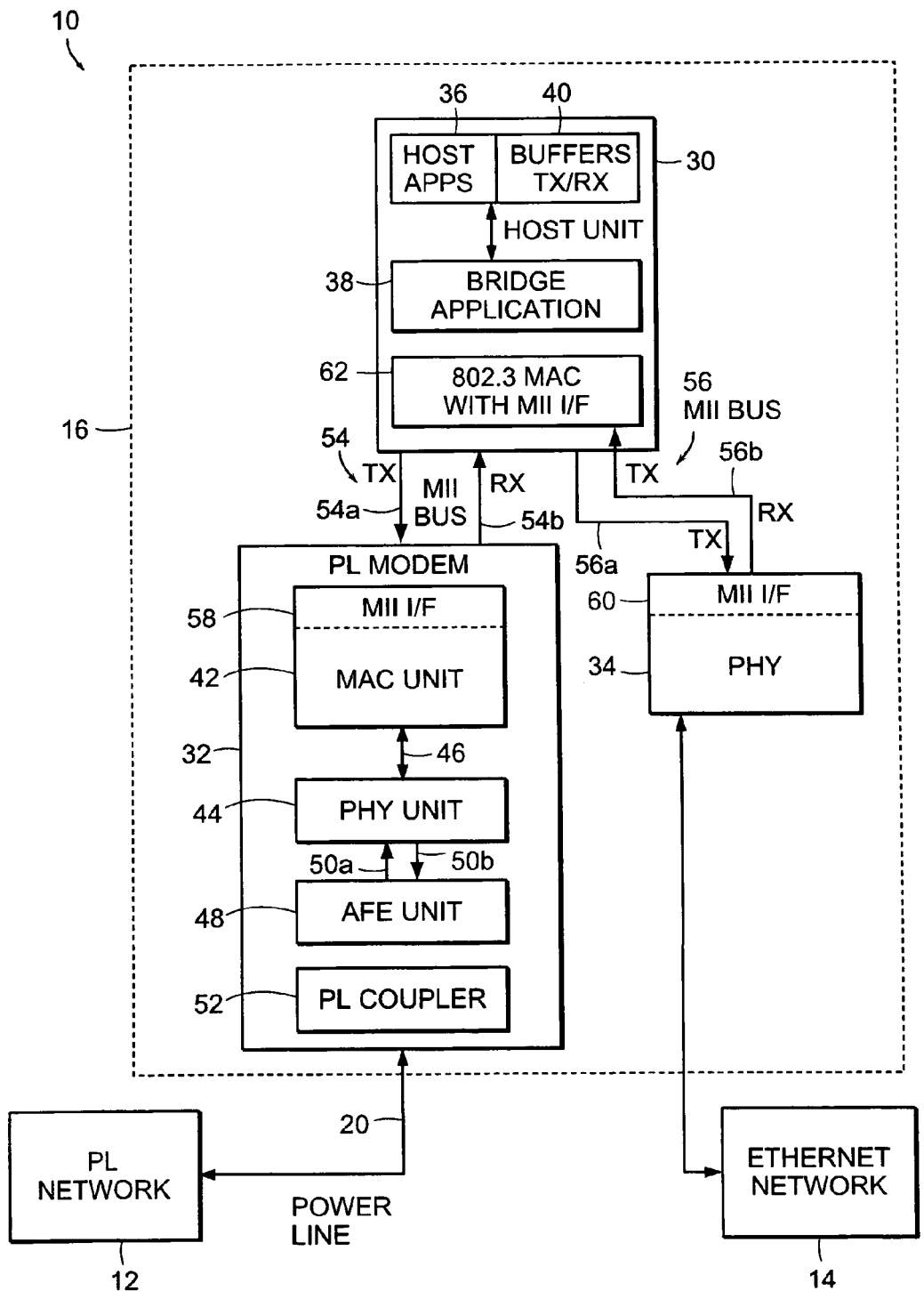
FIG. 2 is a detailed depiction of the bridge device of FIG. 1.

Referring to FIG. 2, details of the bridge device 16 are shown. The bridge device 16 includes a host unit 30 that is coupled to the power line 20 through a PL modem 32 and is further coupled to the Ethernet 24 through an 802.3 PHY device 34. The host unit 30 supports one or more host applications 36. Also residing on the host unit 30 is a bridge application 38 and transmit (TX)/receive (RX) buffers 40 for storing packets being transferred between the networks 12, 14 by the bridge application 38. The PL modem 32 includes a media access control (MAC) unit 42 connected to the host unit 30 by a first data interface 43, a physical layer (PHY) unit 44 connected to the MAC unit 42 by a MAC-to-PHY I/O bus 46 and an analog front-end (AFE) unit 48. The AFE unit 48 connects to the PHY unit 44 by separate AFE input lines 50a and output lines 50b, as well as connects to the transmission medium 20 by an AFE-to-PL interface or coupler 52.

The host unit 30 is intended to represent any device that uses one of the units 32, 34 to communicate with any node on the PL network 12 or the Ethernet network 14. Preferably, the host unit 30 is coupled to both of units 32, 34 by a Media Independent Interface (MII) compatible bus. That is, the host unit 30 is connected to the PL modem 32 by a first MII bus 54 and is connected to the PHY unit 34 by a second MII bus 56. The first MII bus 54 includes separate TX and RX lines 54a and 54b, respectively. Likewise, the second MII bus 56 includes TX and RX lines 56a and 56b, respectively. Each of the units 32, 34 includes a MII bus interface, respective interfaces 43 and 60.

In the embodiment shown, the host unit 30 further includes an 802.3 MAC device with an MII interface 62. It will be appreciated that the 802.3 MAC portion of the unit 62 could be integrated with the PHY unit 34. Because the 802.3 MAC and PHY functionality can be partitioned in different ways, the actual implementation of units 62 and 34 may be a matter of design choice or driven by the choice of particular commercially available Ethernet chips, e.g., a MAC controller chip with a built-in MII interface, or separate MAC and PHY chips with integrated MII interfaces.

With reference to the PL modem 32, preferably the MAC unit 42 and PHY unit 44 may conform to the Open System Interconnect (OSI) Model. More particularly, the MAC unit 42 may conform to the OSI Model's data link MAC sublayer and the PHY layer unit 44 to the OSI Model's physical layer. The MAC unit 42 performs data encapsulation/decapsulation, as well as media access management for transmit (TX) and receive (RX) functions. Preferably, the MAC unit 42 employs a collision avoidance medium access control scheme like carrier sense multiple access with collision avoidance (CSMA/CA) as described by the IEEE 802.11 standard, although other suitable MAC protocols of the collision avoidance type or other MAC protocol types may be used. The MAC unit 42 also provides Automatic Repeat request (ARQ) protocol support. The PHY unit 44 performs transmit encoding and receive decoding, modulation/demodulation, among other functions.

The unit of communication exchanged between nodes is in the form of a protocol data unit ("PDU"), also referred to as a packet or frame. The PDU may include data, i.e., payload (or MAC frame), in conjunction with a delimiter, or a delimiter by itself. The delimiter is a combination of preamble and frame control information. A MAC Service Data Unit (MSDU) refers to any information that the MAC unit 42 has been tasked to transport by upper protocol layers (e.g., OSI layers to which the OSI MAC layer provides services), along with any management information supplied by the MAC unit 42. The payload has a maximum length in time (for latency considerations) and a varying byte capacity determined by length and channel conditions. Therefore, the payload may have the capacity to contain an entire MSDU or only a segment of the MSDU.

Preferably, packets are transmitted and received by the PHY layer unit 44, as well as processed by the MAC unit 42, in accordance with techniques and formats described in U.S. Pat. No. 6,397,368, entitled "Forward Error Correction With Channel Estimation," in the name of Lawrence W. Yonge III et al., U.S. Pat. No. 6,442,129 entitled "Enhanced Channel Estimation," in the name of Lawrence W. Yonge III et al., U.S. Pat. No. 6,289,000, entitled "Frame Control Encoder/Decoder for Robust OFDM Frame Transmissions," in the name of Lawrence W. Yonge III, co-pending U.S. patent application Ser. No. 09/632,303, entitled "Media Access Control Protocol With Priority and Contention-Free Intervals," in the name of Lawrence W. Yonge III, co-pending U.S. patent application Ser. No. 10/180,175, entitled "A Communication Buffer Scheme Optimized for VOIP, QOS and Data Networking Over a Power Line," in the name of James Philip Patella et al., U.S. Pat. No. 6,278,685, entitled "Robust Transmission Mode", in the name of Lawrence W. Yonge III et al., and the HomePlug 1.0 Specification, all of which are incorporated herein by reference; however, other techniques may be used.

Preferably, the MAC unit 42 supports standard MAC functions, such as framing, as well as ensures Quality of Service and provides for reliable frame delivery through a number of different mechanisms such as those described in the above-referenced application Ser. No. 09/632,303. For example, it can support rate adaptive PHY characteristics and channel estimation control between each transmitter/receiver to establish PHY modulation parameters that are optimized for channel conditions in each direction.

Also, as mentioned above, ARQ is used to ensure delivery for unicast transmissions. The receipt of certain frame types requires acknowledgment by the receiver and ARQ uses different types of acknowledgments. The acknowledgment can be positive or negative depending on the status of the received frame. A correctly addressed frame with a valid PHY frame Check Sequence causes the MAC unit 42 to transmit a positive acknowledgment (or "ACK") response to the originator. Transmitting nodes attempt error recovery by retransmitting frames that are known or are inferred to have failed. Failures occur due to collisions or bad channel conditions, or lack of sufficient resources at the receiver. Transmissions are known to have failed if a "NACK" (in the case of bad channel conditions) or "FAIL" (in the case of insufficient resources) response is received. Transmissions are inferred to have failed for some other reason (for example, due to collisions) if no response, that is, no ACK, NACK, FAIL or other defined response types not discussed herein, is received when one is expected.

As mentioned above, the MAC unit 42 supports segmentation/reassembly. The process of partitioning MSDUs from the host into smaller MAC frames or segments is referred to as segmentation. The reverse process is called reassembly. Segmentation improves chances of frame delivery over harsh channels and contributes to better latency characteristics for stations of higher priority. All forms of addressed delivery (unicast, multicast, broadcast) may be subject to segmentation. An MSDU arriving at the MAC unit 42 is placed in one or more segments depending on the size of the MSDU and the data rate the link will sustain. Every effort is made to transmit all of the segments of a single MSDU in a single, continuous burst of MAC frames. Acknowledgments and retransmissions occur independently for each segment.

Figure 3:
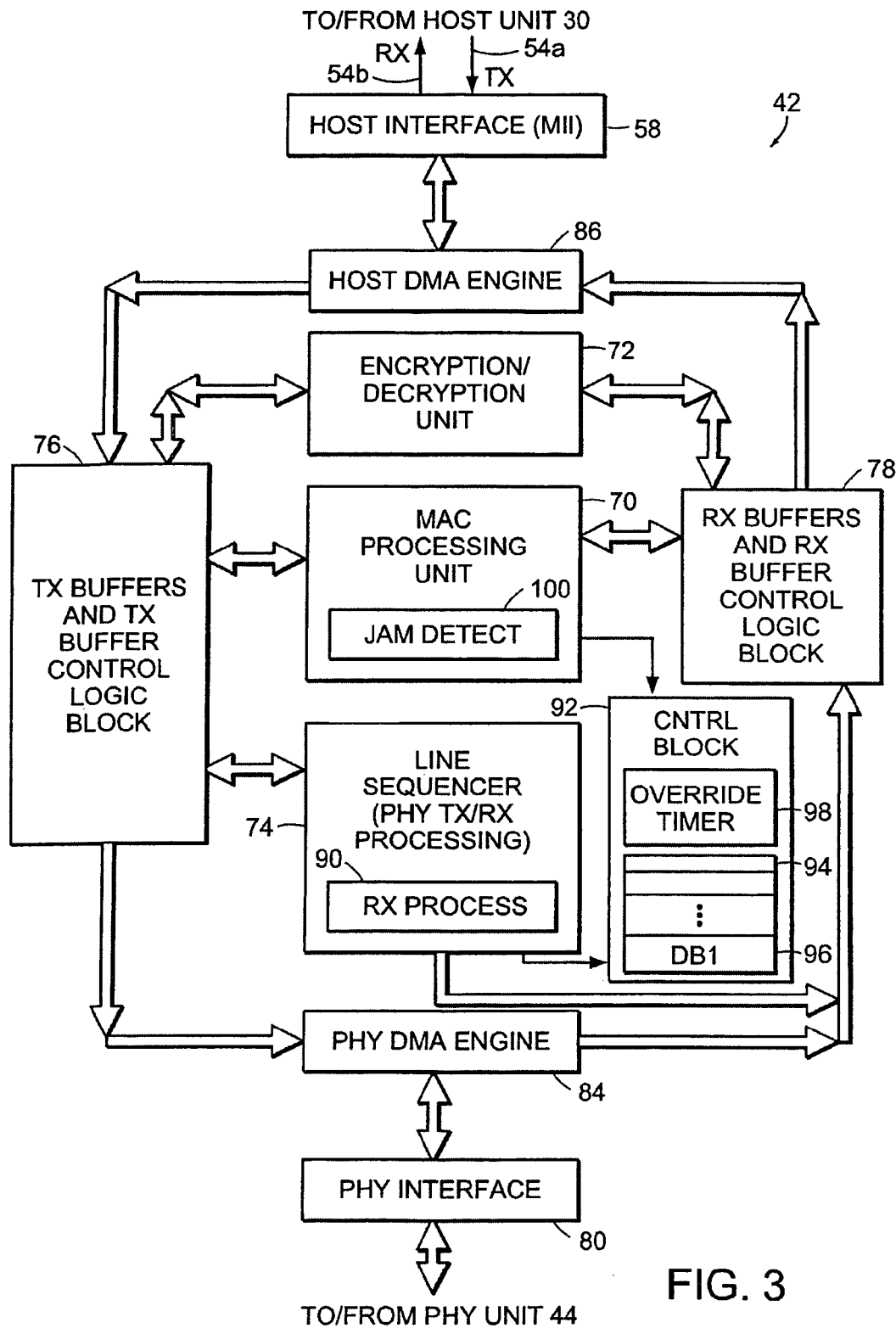
FIG. 3 is a block diagram of a powerline media access control (MAC) unit residing in the bridge device of FIG. 2.

Referring to FIG. 3, an architectural representation of the MAC unit 42 is shown. The MAC unit 42 includes a MAC processing unit 70, an encryption/decryption unit 72 and a link sequencer 74. Coupled to these three functional blocks are buffer memory and control logic blocks 76 and 78. Block 76 includes TX buffers and control logic and the block 78 includes RX buffers and control logic. These buffer memories may be optimized for the multi-level channel access prioritization, as described in the above-referenced application entitled "A Communication Buffer Scheme Optimized for VOIP, QOS and Data Networking Over a Power Line."

The MAC unit 42 further includes a PHY interface 80 for coupling to the PHY unit 44 and a Host Interface, implemented as the MII interface 43 (from FIG. 2) for coupling to the host 30. Although not shown, the host interface 43 includes separate host RX and TX interfaces. The MAC unit 42 includes two DMA engines, one for the PHY side, that is, a PHY DMA engine 84, and one for the host side, a Host DMA engine 86. The PHY DMA engine 84 moves frame data from the PHY interface 80 to the RX buffer block 78. The host DMA engine 86 provides for the transfer of data from the RX buffer block 78 to the host interface 43. The host interface 43 provides the data as an output to the host 30 (FIG. 2) on the MII buses 54a, 54b. The host interface 43 receives TX data from the host 30 over the MII bus TX line 54a and stores the TX data in a TX host interface buffer (not shown), coupled to the host interface 43 and the host DMA engine 86. The host DMA engine 86 transfers the TX frame data from the TX host interface buffer to the TX buffer block 76. Data is moved from the TX buffer memory 76 to the PHY interface 80 by the PHY DMA engine 84.

During receives, the link sequencer 74 receives RX segments which can be RX encrypted segments (RES). It parses frame control information of any incoming segments, as well as receives the body of any incoming segments, saves information about the channel characteristics and reassembles the RES. The link sequencer 74 accumulates segments until an entire frame is assembled. All segments are reassembled prior to decryption to extract the MSDU. The MSDU or RX encrypted frame (REF) or RX cleartext frame (RCF) is then passed to the decryption unit 72.

The decryption unit 72 receives the reassembled frame from the link sequencer 74 and, if the frame is encrypted, retrieves an appropriate network encryption key and decrypts the frame to generate the RCF. The decryption unit 72 determines if there are any errors in the RCF. If there are no errors detected by the decryption unit 72 for the RCF, the decryption unit 72 provides the RCF to the MAC processing unit 70.

The MAC processing unit 70 parses and processes the cleartext frame body. It determines the type of frame body from the type value specified in the first occurring type field. If the frame data to follow is MSDU data, the type field and the frame data, along with the DA field and the SA field, are provided to the host unit 30 (FIG. 2) for further processing. Otherwise, the frame data comprises MAC management information, and the MAC processing unit 70 performs MAC management processing related tasks according to the MAC management information.

During transmits, the MAC processing unit 70 operates on requests made by the host unit 30. The encryption unit 72 performs an encryption process on any MSDUs (processed by the MAC processing unit 70) that require encryption. Once encrypted, the link sequencer 74 segments MSDUs by partitioning the frame body into segments based on a maximum segment (or frame) size (or other parameters) until the last segment. The link sequencer 74 also initiates a transmission or transmission attempt, as well as subsequent transmission retries, as necessary.

Still referring to FIG. 3, and as indicated above, the link sequencer 74 includes a receive process 90, as well as a transmit process (not shown). The receive process 90 is optimized to perform congestion control, as will be described. To support this optimization, the MAC unit 42 further includes a control block 92 in which the MAC unit 42 maintains link sequencer status registers 94, one of which is defined to use at least a portion thereof as a FAIL response override indicator 96. In the embodiment shown, the indicator 96 is a single bit, referred to as an Override Bit ("OB") 96. When set, the OB 96 causes the RX process 90 of the link sequencer 74 to issue FAIL responses to all received unicast frames for which a response is expected. Typically, information that indicates whether or not a response is expected is specified in a Start-of-Frame (SOF) type of frame delimiter, e.g., as described in the above-referenced U.S. application Ser. No. 09/632,303. The control block 92 further includes a FAIL response override timer 98 (hereinafter, simply "override timer"), which is set by the MAC processing unit 70 when the OB is set, as will be discussed in further detail below.

The MII is an industry standard, interoperable interface between MAC and PHY sublayers. It consists of separate 4-bit data paths for transmit and receive data along with carrier sense and collision detection. Data is transferred over each 4-bit data path synchronous with a clock signal supplied to the unit 62 by the MAC unit 42. Further details of the MII can be found in the IEEE 802.3u Standard. The MII behaves much like an Ethernet interface without the physical layer.

Commercially available Ethernet MAC controller devices can be programmed to invoke Ethernet flow control whenever buffers are not available to receive a new host RX frame. Such devices send a jam frame in half-duplex mode over the MII (more specifically, the TX bus lines) whenever a new RX frame is detected and no host buffers are available.

Referring back to FIG. 2, the MII bus interface 62 operates in this manner. When a frame is detected on any of the RX buses 54b, 56b and the bridge application 38 determines that the RX buffer threshold of the RX buffers in the buffer 40 is exceeded, the bridge application 38 uses the MII bus interface 62 to send a jam packet or frame over the appropriate TX bus 54a, 56a to the attached unit. If the attached unit is an Ethernet device, such as the 802.3 PHY device 34, the jam frame has the conventional impact of triggering a back-off algorithm in the sending device, that is, the device that sent the frame that caused the transmission of the jam packet.

Because the mere transmission of a jam packet over the PL 20 may not result in such a desired flow control activity, the MAC processing unit 70 and link sequencer 74 are adapted to use control information in the control block 92, more specifically, the OB 96 and override timer 98, to effect a slow down in transmissions from the PL network 12 when a node on that network results in the transmission of a jam frame by the host unit 30.

Figure 4A:
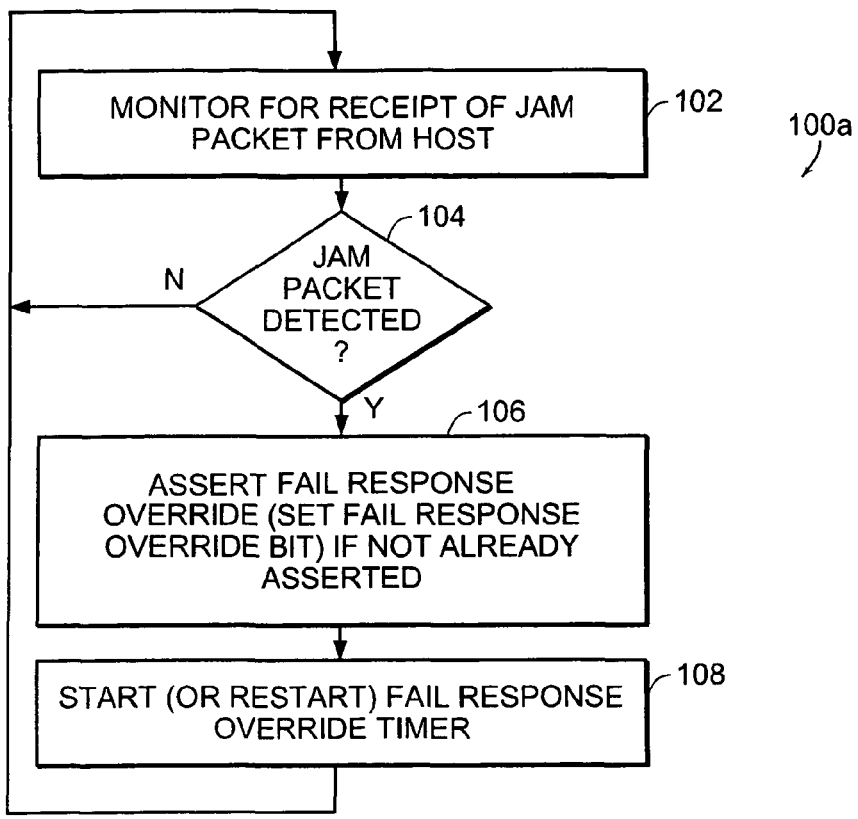
FIGS. 4A and 4B are flow diagrams illustrating processes of a link sequencer (in the powerline MAC unit of FIG. 3) that control a FAIL response override mechanism responsive to "jam" packets by a host unit within the bridge device (of FIG. 2).
Figure 4B:
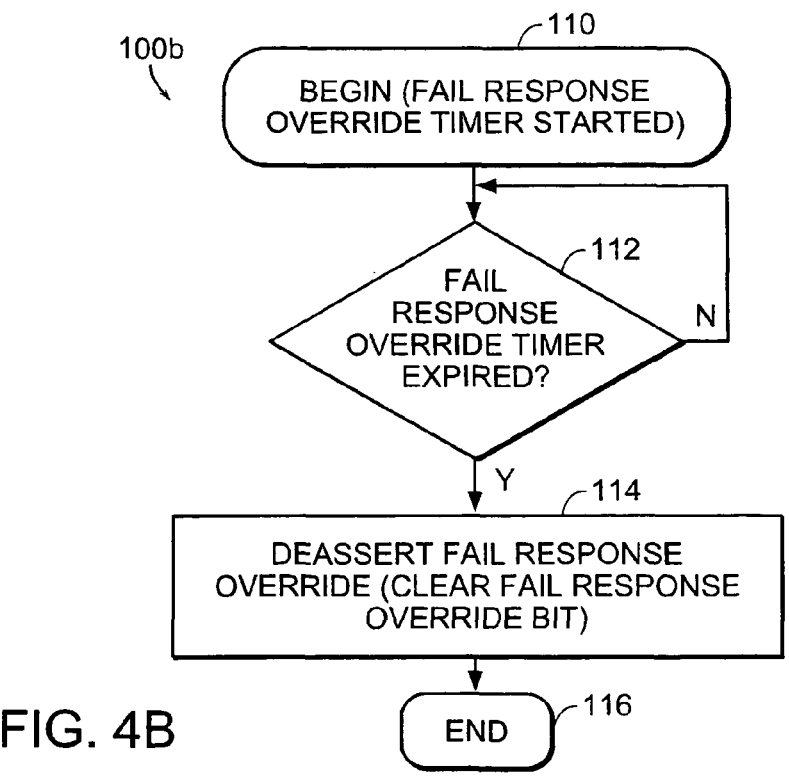

In particular, the MAC processing unit 70 includes "jam detect" logic 100 to sense a "jam packet" (defined as a short packet, approximately 68 bits of alternating ones and zeroes) from the host unit 30. FIGS. 4A and 4B illustrates the operation of the jam detect logic 100 as two processes or logic 100a and 100b. Referring first to FIG. 4A, the process 100a monitors packets received from the host unit 30 by the MAC processing unit 70 for jam packets (step 102). If the process 100a detects a jam packet (step 104), the process 100a asserts a FAIL response override signal by setting the OB (step 106) if the OB is not already set. It also starts the override timer 98 (or re-starts the override timer 98 if the override timer 98 is already running) (step 108). Referring to FIG. 4B, the process 100b begins (step 110). When it detects that the override timer 98 has expired (step 112), the process 100b de-asserts the FAIL response override signal by clearing the OB 96 (step 114) and terminates (step 116).

Thus, upon sensing a jam packet, the logic 100 asserts the FAIL response override indicator 96 and starts the override timer 98 running for some predefined duration. The jam packet transmission is based on a buffer threshold. It keeps extending the timer value (duration) with each detected jam until the override timer 98 expires. The duration corresponds to a predefined timer value (e.g., ~20 ms default value). When the override timer 98 expires, the logic 100 resets the FAIL response override indicator 96. When the OB 96 is set, and the RX process 90 is processing a unicast frame for which a response is expected, the RX process automatically sends a FAIL response to the transmitting node on the PL network 12; otherwise, the RX process 90 provide FAIL responses under normal conditions, as will be described.

Figure 5:
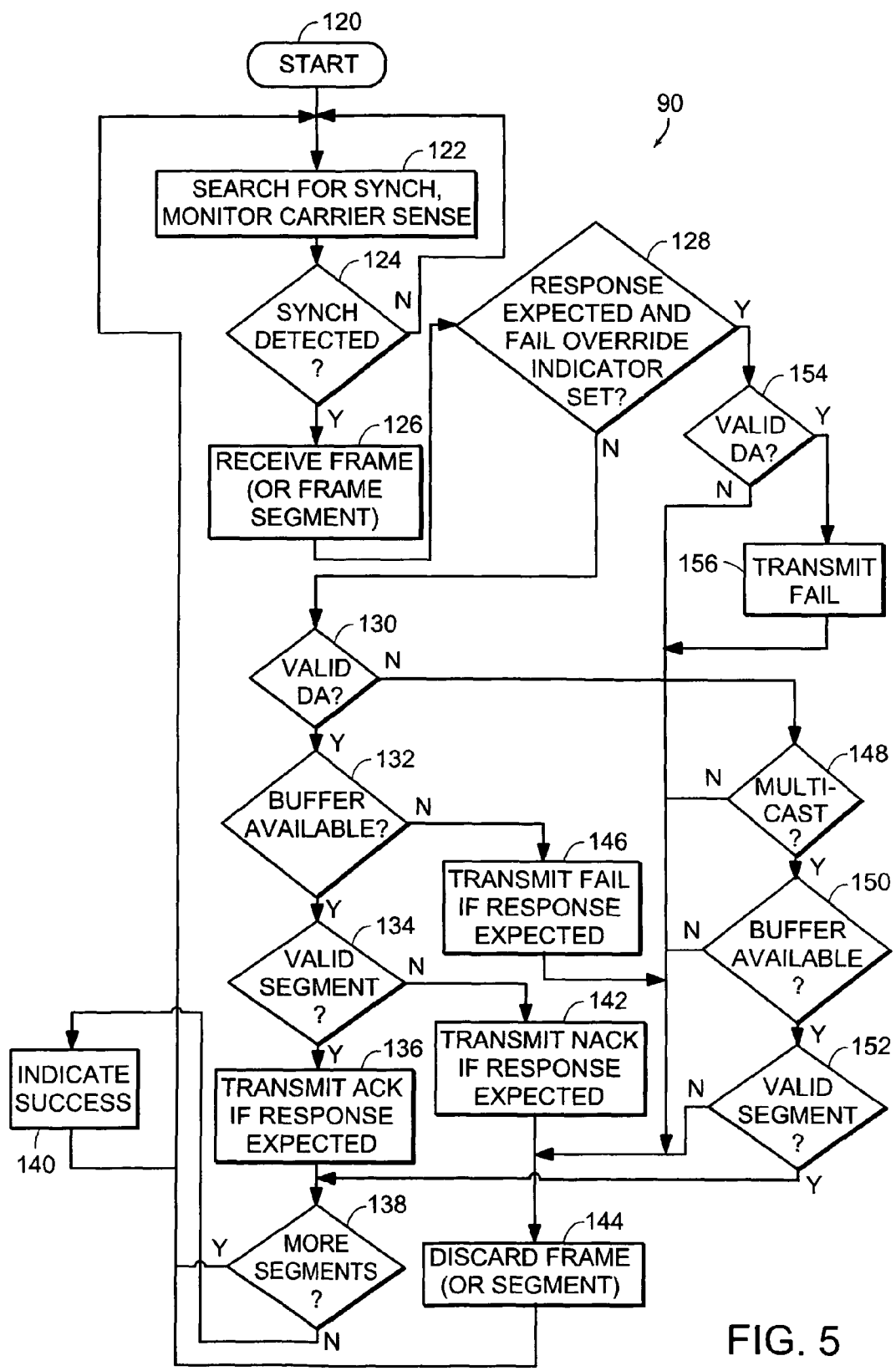
FIG. 5 is a flow diagram of a receive (RX) process (in the powerline MAC unit of FIG. 3) that uses the FAIL response override mechanism during packet receive operations to effect flow control of traffic being sent by the powerline network to the Ethernet network.

Referring to FIG. 5, the RX process 90 begins (step 120) by searching for a synchronization signal and monitoring the carrier sense logic (step 122). If the process 90 determines that a synchronization signal has been detected (at step 124), the process 90 receives the incoming frame (or segment) (step 126). As it receives the segment, the process 90 parses the frame control field in the delimiter of the incoming segment. The process 90 determines if the frame is a unicast frame for which a response is expected and the OB is set (step 128). If these conditions are not met, the process 90 proceeds to handle the frame, in particular, the ARQ mechanism in a normal manner.

The process 90 determines if the destination address (DA) is valid (step 130). If the DA is valid, the process determines if an RX buffer is available (step 132). If buffer space is available, the process determines if the segment is received in error by checking the FEC error flag and determining if a calculated CRC is not equal to the FCS (step 134) and, if valid and a response is requested, the process prepares and directs the transmission of an ACK response (step 136). The process determines if additional segments are to be received as part of a segmented frame (step 138). If no more segments are to be received, the process indicates successful frame reception (to the other RX processes) (step 140) and proceeds to carrier sense monitoring and synchronization signal searching of step 122.

Still referring to FIG. 5, and referring back to step 134, if the segment is invalid, and a response is expected, the process prepares and causes the transmission of a NACK response (step 142). The process discards the frame or segment (step 144) and returns to step 122. If, at step 132, buffer space is not available, and a response is expected, the process prepares and causes the transmission of a FAIL response (step 146) and returns to the step of discarding the frame or segment at step 144. If, at step 130, the DA is invalid, the process 90 determines if the segment is multicast addressed (step 148). If the segment is multicast-addressed, the process determines if buffer space is available (step 150). If buffer space is available, the process determines if the segment is valid (step 152). If the segment is valid, the process proceeds to step 138 to check for additional incoming segments. If, at step 148, the segment was determined to be unicast addressed, or, the process determines that the segment is multicast but that insufficient buffer space is available at step 150, the process proceeds to step 144 (discarding the frame).

Otherwise, and returning to step 128, if it is determined at step 128 that the conditions (unicast with response expected and OB set) are met, the process 90 determines if the DA is valid (step 154). If the DA is determined not to be valid (at step 154), the process 90 discards the frame or segment (at step 144). If the DA is determined to be valid (at step 154), the process 90 transmits a FAIL response (step 156). By doing so, the process 90 makes it appear to the transmitting node as though resources are not available, thus causing the transmitting node to take appropriate action. In response to the FAIL response, the transmitting node may attempt to re-transmit the frame (to which the FAIL response responded) at a later time, or, under certain conditions (for example, if a frame lifetime timer times out), simply discard the frame. Exemplary activities of a transmitting node that receives a FAIL response are described in the above-referenced U.S. application Ser. No. 09/632,303. After transmitting the FAIL response, the process 90 proceeds to step 144.

A requirement of this override mechanism is that the bridge application 38 have sufficient buffer capacity in the buffers 40 after sending the jam packet to process some additional number of frames from the first network 12 to account for latency.

This override response mechanism gives the bridge application 38 time to unload its buffers by sending pending frames intended for the second network 14 to the second network 14. Frames (multi-cast or unicast) received from the first network 12 that do not expect a response will be accepted and processed by the link sequencer 74, but may be dropped by the host unit 30 if the host unit 30 does not have available buffer capacity.

Other control information that does not directly pertain to the congestion control, for example, control information related to channel access contention, has been omitted herein. Preferably, channel access contention, and other aspects of operation not described herein, may be implemented according to techniques described in the above-referenced U.S. patent application Ser. No. 09/632,303 or the HomePlug 1.0 Specification. Other techniques may be used as well.

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of performing flow control in a network, comprising: a node in a network of nodes detecting receipt of a jam-indicating packet from a bridge device in response to an attempt by the node to transmit a frame to the bridge device, wherein the jam-indicating packet has a generally unique content that is recognizable by nodes as an indication that a device on the network is congested and requests that it not be sent further packets; in response to detection of the jam-indicating packet by the node, causing a fail response to be transmitted by the node to the network for the frame; and for a predetermined time interval after the detection, causing another fail response to be transmitted by the node to the network for any subsequent frames transmitted by any of the other nodes when such frames are of the type for which a response is expected, wherein the fail response transmitted in response to receipt of the jam-indicating packet is the same fail response ordinarily transmitted, at times other than when a device on the network is congested, to indicate that a frame has not been received because of insufficient resources, wherein the network is a powerline network, and the fail response is transmitted to the powerline network.

2. The method of claim 1, wherein causing comprises:
asserting a fail response override signal when the receipt of the jam-indicating packet is detected;
setting a fail response override timer to time the predetermined time interval; and
de-asserting the fail response override signal upon expiration of the fail response override timer.

3. The method of claim 2, wherein causing further comprises:
determining if a frame transmitted by one of the nodes is a unicast frame for which a response is expected; and
determining if the fail response override signal is asserted.

4. The method of claim 3, wherein causing further comprises:
if it is determined that the frame is a unicast frame for which a response is expected and that the fail response override signal is asserted, transmitting a fail response.

5. The method of claim 3, wherein causing further comprises:
otherwise, sending a response in accordance with ARQ protocol.

6. The method of claim 1, wherein the network of nodes is a powerline network.

7. The method of claim 6, wherein the nodes in the network of nodes operate according to HomePlug 1.0 Specification protocols.

8. The method of claim 1, wherein the jam-indicating packet is received over a Media Independent Interface bus.

9. The method of claim 1, wherein the bridge device comprises a host computer that executes a bridge application.

10. A computer program residing on a non-transitory computer-readable medium for performing flow control in a network, the computer program comprising instructions causing a node in a network of nodes to: detect receipt of a jam-indicating packet from a bridge device in response to an attempt by the node to transmit a frame to the bridge device; wherein the jam-indicating packet has a generally unique content that is recognizable by nodes as an indication that a device on the network is congested and requests that it not be sent further packets; in response to detection of the jam-indicating packet by the node, cause a fail response to be transmitted by the node to the network for the frame; and for a predetermined time interval after the detection, cause another fail response to be transmitted by the node to the network for any subsequent frames transmitted by any of the nodes when such frames are of the type for which a response is expected, wherein the fail response transmitted in response to receipt of the jam-indicating packet is the same fail response ordinarily transmitted, at times other than when a device on the network is congested, to indicate that a frame has not been received because of insufficient resources, wherein the network is a powerline network, and the fail response is transmitted to the powerline network.

11. A system comprising: a jam-indicating packet detector at a node in a network of nodes for detecting receipt of a jam-indicating packet from a bridge device in response to an attempt by the node to transmit a frame to the bridge device;
wherein the jam-indicating packet has a generally unique content that is recognizable by nodes as an indication that a device on the network is congested and requests that it not be sent further packets;
means, responsive to detection of a jam-indicating packet by the jam-indicating packet detector, for causing a fail response to be transmitted by the node to the network for the frame;
for a predetermined time interval after the detection, means for causing another fail response to be transmitted by the node to the network for any subsequent frames transmitted by any of the nodes for a predetermined time interval when such frames are of the type for which a response is expected,
wherein the fail response transmitted in response to receipt of the jam-indicating packet is the same fail response ordinarily transmitted, at times other than when a device on the network is congested, to indicate that a frame has not been received because of insufficient resources, wherein the network is a powerline network, and the fail response is transmitted to the powerline network.

* * * * *